United States Patent
Callies

[11] Patent Number: 5,564,248
[45] Date of Patent: Oct. 15, 1996

[54] CONSTRUCTION HANGER AND METHOD OF MAKING THE SAME

[75] Inventor: Gerald Callies, New Prague, Minn.

[73] Assignee: United Steel Products Company, Montgomery, Minn.

[21] Appl. No.: 336,995

[22] Filed: Nov. 10, 1994

[51] Int. Cl.$^6$ ............................ E04B 1/38; F16B 1/00
[52] U.S. Cl. ............................ 52/702; 52/289; 52/715; 403/232.1
[58] Field of Search ............................ 52/702, 289, 712, 52/715; 403/232.1

[56] References Cited

U.S. PATENT DOCUMENTS

| | | | |
|---|---|---|---|
| 546,147 | 9/1895 | Gregg | 403/232.1 |
| 3,601,428 | 8/1971 | Gilb | 52/702 X |
| 3,633,950 | 10/1972 | Gilb | 52/702 X |
| 4,411,548 | 10/1983 | Tschan | 403/232.1 |
| 4,480,941 | 11/1984 | Gilb et al. | 403/232.1 |
| 4,802,786 | 2/1989 | Yauger et al. | 52/702 X |
| 4,920,725 | 5/1990 | Gore | 52/702 |
| 5,111,632 | 5/1992 | Turner | 52/702 |

OTHER PUBLICATIONS

An advertisement for Simpson Strong Tie Connectors entitled ITT/IT/MIT/HIT Hangers, Copyright 1992.
Description of prior art in the "Description of Prior Art" section on p. 3, lines 6–19 of the present application.

*Primary Examiner*—Robert Canfield
*Attorney, Agent, or Firm*—Dorsey & Whitney LLP

[57] ABSTRACT

A construction hanger for supporting a joist, rafter or the like to a support beam, in which the hanger is provided with a holddown tab for insuring proper seating of the joist to the hanger during the installation process. The invention also relates to a method of making such a hanger.

23 Claims, 4 Drawing Sheets

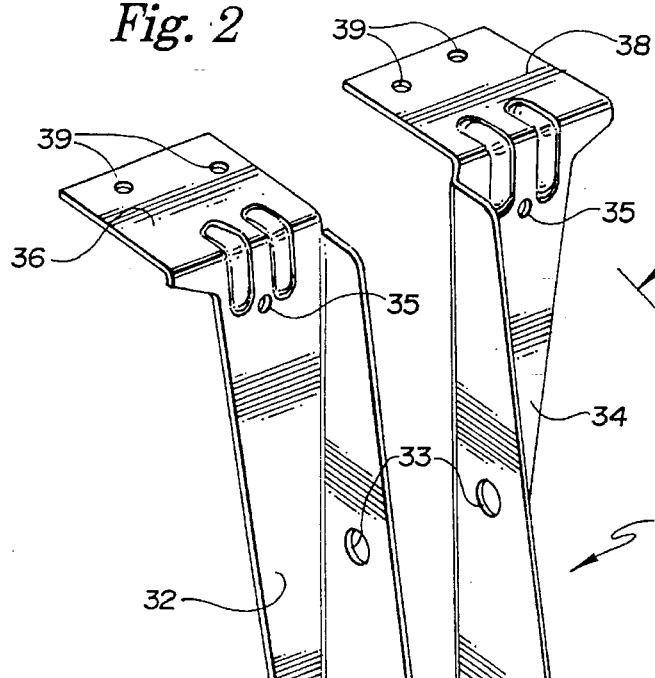
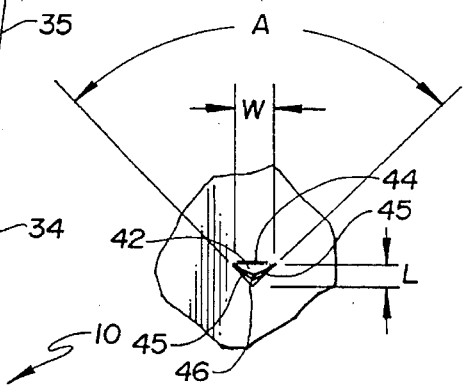
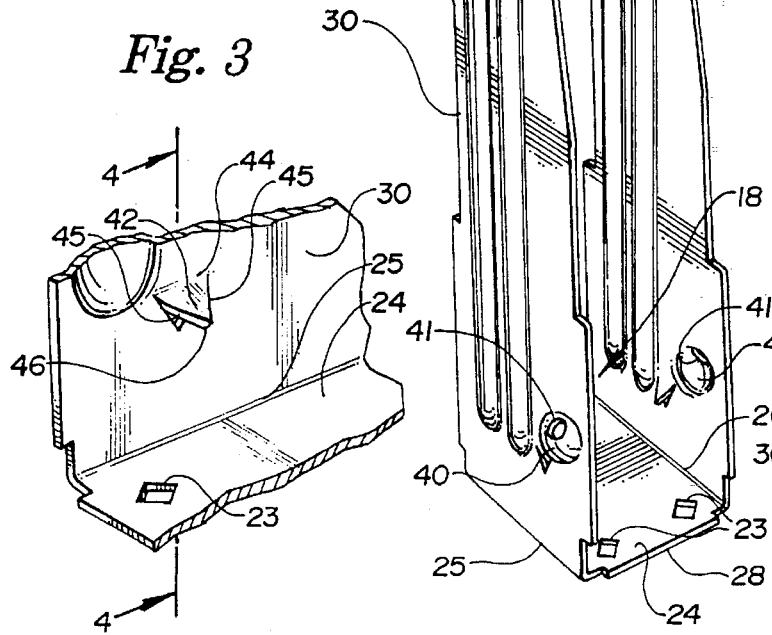
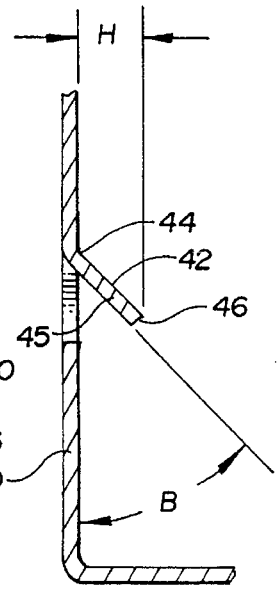

CONSTRUCTION HANGER AND METHOD OF MAKING THE SAME

BACKGROUND OF THE INVENTION

1. Field of the Invention

The present invention relates generally to the field of construction hangers, and more particularly to a construction hanger for supporting a first wooden member relative to a second wooden member in which the hanger is provided with an improved means for retaining the first member relative to the hanger and preventing the same from being drawn up off the hanger seat during the installation process. The present invention also relates to a method of making such a hanger.

2. Description of the Prior Art

In the construction industry, supported wooden members such as joists, rafters or the like are connected to supporting wooden members such as header support beams, ridge beams, etc. by various types of hangers. In general, such hangers include a seat portion comprised of a seat bottom and seat sides for supporting the joist and means in the form of one or more flanges for connecting the hanger, and thus the joist, to the header beam or other supporting member. Such hangers also typically include nail holes for connecting the seat sides to the joist. A variety of flange configurations are used to connect the hanger to the supporting member. These include an overhead configurations with flanges for connection to the top of the header beam, face mount configurations with flanges for connection to the face of the header beam and wrap around configurations hanger with flanges extending over the top of the header beam.

During the installation process, the hangers are first attached to the header beams, after which the joists are positioned into the hangers so that the ends of the joist are supported in the seat portions of the hangers. The installer then connects the joist to the hanger usually by driving a nail or nails through nail holes in the seat sides and into the joist. As this is done, if the nail is slanted downwardly, it is common for the joist to be drawn up toward the nail hole as the nailing is completed. This causes the joist to "ride up" in the hanger if not connected or otherwise retained, to the point where the joist is no longer seated on the seat bottom. This in turn can result in the top surfaces of the joists being misaligned and squeaky floors or the like after construction is complete. Thus, it is important for the joists to be firmly connected with the hanger and seated within the seat portion, with the bottom edge of the joist seated on the seat bottom.

Several hangers have been designed with holddown devices for solving the above problem and insuring that the joist is fully and properly seated within the seat portion during the construction process. One of these involves the provision of a tab on a side flange of the seat portion which is intended to be bent over and nailed to a top surface of the lower flange of an I-joist. As the tab is nailed into the joist, the tab bends to accommodate the position of the joist rather than drawing the joist off the hanger seat. Thus, the joist remains fully seated within the seat portion of the hanger. Although this structure functions satisfactorily for an I-joist, it is not a significant improvement over conventional hangers when used with laminated or full dimension lumber joists. Even when used with I-joists, the hanger installation involves the extra step of bending the tabs over the top surface of the I-joist bottom flange. The above device is marketed by Simpson Strong-Tie under the trademark "Bend Tab".

A further structure designed to solve the above problem involves providing an inwardly extending prong on each of the seat portion sides for engagement with the top surface of an I-joist bottom flange. Thus, the prongs of this structure are positioned so that the bottom edge of the prong will engage the top surface of the I-joist bottom flange to retain it in proper seating engagement. Although this hanger functions acceptably for I-joists, and is less time consuming than the bend over tabs of the Simpson device, it can be used effectively only with I-joists. If laminated beams or full dimension lumber is used in such hangers, the prongs do not function to properly seat the joist relative to the hanger. In fact, use of laminated or full dimension lumber will engage the prongs, thus causing the seat portion sides to be spaced from the sides of the joist.

A still further solution has been to provide alternate screw holes in the bottom of the seat. If a squeaky floor occurs, screws can be driven into these holes to solve the problem.

Accordingly, there is a need in the art for a joist hanger or the like with an improved means for positioning a joist within the seat portion of the hanger and positively retaining the joist in such position during nailing of the hanger to the joist.

SUMMARY OF THE INVENTION

In contrast to the prior art, the present invention relates to a construction hanger for supporting a joist, rafter or the like to a supporting beam, in which the hanger is provided with an improved means for quickly and easily seating the joist relative to the hanger within the seat portion and insuring such seating position during the installation process.

The hanger in accordance with the present invention includes a support seat or pocket portion having a seat bottom and a pair of seat sides for supporting the joist, rafter or other supported member. Connected with the seat portion are a plurality of connection or support flanges for connecting the hanger to a header beam or other supporting member. The holddown means of the hanger of the present invention includes the provision of a tab extending inwardly from at least one of the seat portion sides for engaging the sides of the joist or other supported member and preventing upward movement of such member after it has been properly seated. In the preferred embodiment, the tabs are positioned near the lower end of the seat portion so that such tabs will engage the sides of either an I-joist, a laminated joist or a full dimensioned lumber joist. The tab preferably has a triangular shape with a free point pointed downwardly toward the seat bottom so that as the joist is inserted into the seat portion past the tab, the point of the tab digs into the sides of the joist and prevents any subsequent upward movement.

A secondary advantage is that the tabs also prevent any subsequent longitudinal movement of the joist. A further advantage of the hanger of the present invention is that it can also be used with steel joists to prevent upward or other movement of the joist when the tab is located above the lip of the bottom return of the steel joist.

The method of making the hanger of the present invention includes forming a hanger blank from sheet metal and then forming, either together with or subsequent to the forming of the blank, a holddown tab preferably of triangular configuration, via a punch process. The triangular holddown tab of the preferred embodiment includes a base edge connected with the seat side along a bend line and a pair of free edges severed from the seat side. The free edges intersect to form a free end triangular tip.

Accordingly, an object of the present invention is to provide a joist hanger having an improved means for insuring proper seating of the joist within the hanger.

Another object of the present invention is to provide a joist hanger having means for quickly and easily positioning and seating a joist within the hanger to prevent the joist from moving upwardly or outwardly off the seat bottom during the installation process.

Another object of the present invention is to provide a joist hanger with means for retaining a joist in proper seated position in which such hanger can be used effectively with I-joists as well as laminated and full dimension lumber joists.

A still further object of the present invention is to provide a joist hanger or the like for supporting a supported member relative to a supporting member with means in the form of a holddown tab for insuring and maintaining proper seating between the supported member and the hanger during the installation process.

A still further object of the present invention is to provide a method of making the above described hanger.

These and other objects of the present invention will become apparent with reference to the drawings, the description of the preferred embodiment and the appended claims.

DESCRIPTION OF THE DRAWINGS

FIG. 2 is an isometric view of the hanger of the present invention in the form of a wrap around configuration with flanges extending over the top of the header beam.

FIG. 3 is an isometric view of a portion of the hanger of the present invention showing the joist retaining tab.

FIG. 4 is a sectional view as viewed along the section line 4—4 of FIG. 3.

FIG. 5 is a fragmentary elevational view of one of the holddown tabs of the hanger of the present invention.

DESCRIPTION OF THE PREFERRED EMBODIMENT

Figure 1:
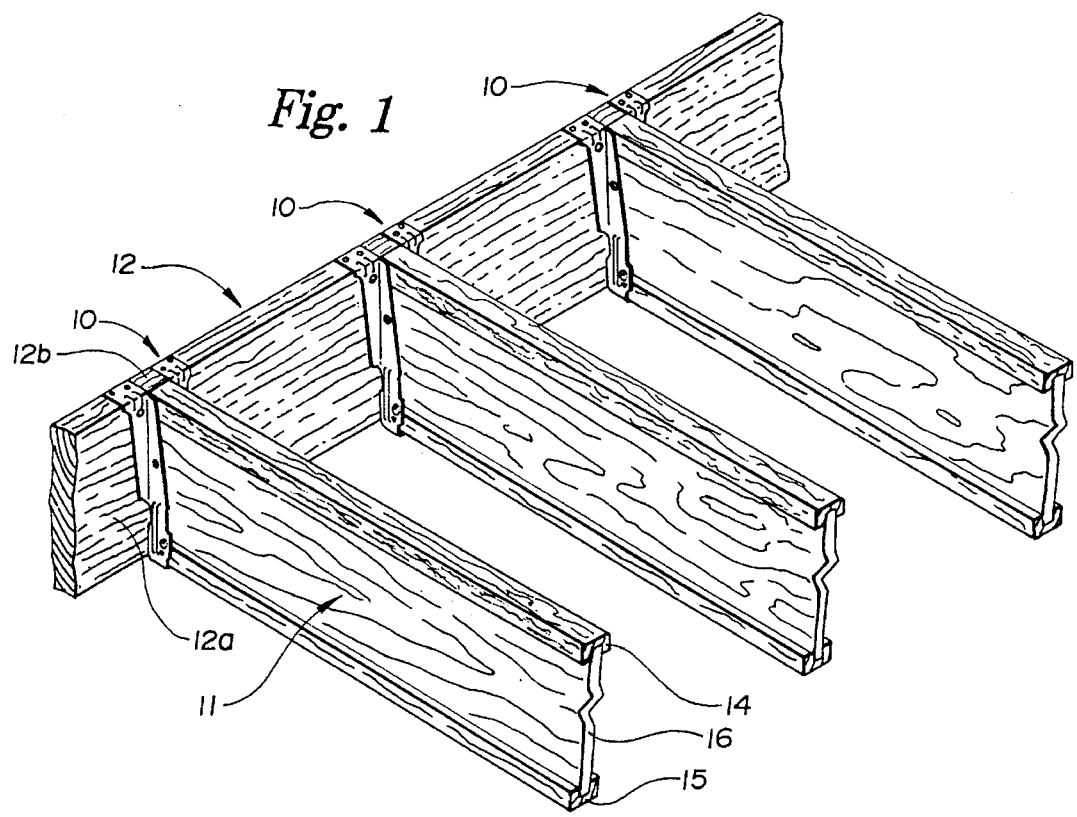
FIG. 1 is an isometric view of a header beam and a plurality of hangers of the present invention supporting a plurality of I-joists.

Reference is first made to FIG. 1 showing a plurality of hangers 10 of the present invention supporting a supported wooden member 11 relative to a supporting wooden member 12. In the preferred embodiment of FIG. 1 the supported member 11 is an I-joist or I-beam joist, however, the member 11 may also be a laminated or a full dimension lumber joist as is well known in the art. The hangers 10 of FIG. 1 are what are referred to as wrap around hangers. However, they can incorporate other configurations as well, such as the overhead configuration shown in FIG. 9 and the facemount configuration shown in FIG. 10. The I-joist 11 of the preferred embodiment includes a top flange portion 14, a bottom flange portion 15 and a web 16 extending between the flange portions 14 and 15. The flange portions 14 and 15 and the web 16 provide a generally "T" shaped cross-sectional configuration. The supporting member in the form of the header beam 12 includes a front face 12a and a top edge 12b.

Figure 6:
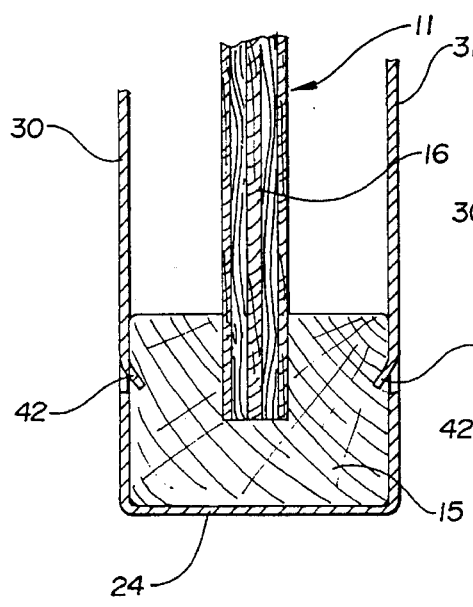
FIG. 6 is a sectional view cut by a vertical plane extending through the holddown tabs and showing the retention of an I-joist.
Figure 7:
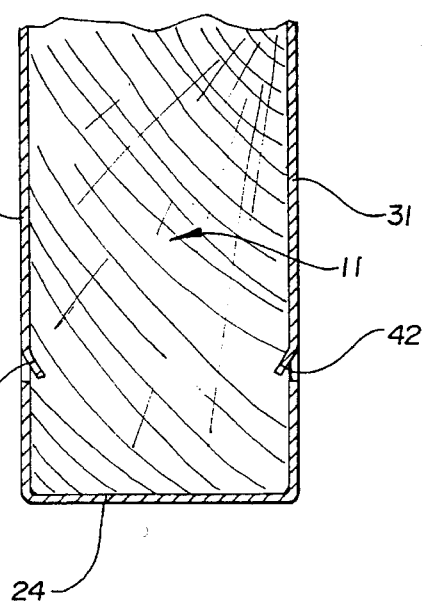
FIG. 7 is a view similar to FIG. 6 except that the I-joist has been replaced by a full dimension lumber joist.

As illustrated best in FIG. 2, the hanger 10 comprises a seat portion 18 with a seat bottom 24 having a first side edge 25, a second side edge 26 and front and back edges 28 and 29. The seat bottom 24 provides support for the supported wooden member or joist 11. In the preferred embodiment, the seat bottom 24 has a generally rectangular configuration and is provided with a pair of alternate screw openings 23, 23. The seat bottom 24 can, however, have other configurations such as a parallelogram for a skew hanger. When the joist 11 is properly seated within the hanger, the seat bottom 24 engages the bottom edge of the joist 11 as shown in FIGS. 1, 6 and 7.

With continuing reference to FIG. 2, a pair of seat flanges or seat sides 30, 31 are integrally joined to the side edges 25, 26 of the seat bottom 24. The seat sides 30, 31 are generally parallel to one another and extend upwardly from the seat bottom 24. In the hanger of the preferred embodiment, the sides 30, 31 extend at right angles relative to the seat bottom 24, however, the benefits of the present invention can also be obtained with hangers such as slope hangers in which the angle between the sides and the seat bottom is not perpendicular. Each of the seat flanges 30,31 includes a joist facing side and an outer side. The joist facing sides face each other and, when a joist 11 is installed, face opposite side surfaces of the joists 11. The seat sides 30, 31 provide lateral support for the joists 11 positioned in the hanger 10. The sides can, if desired, also contain pilot holes 33 for use in the manufacturing process.

Figure 9:
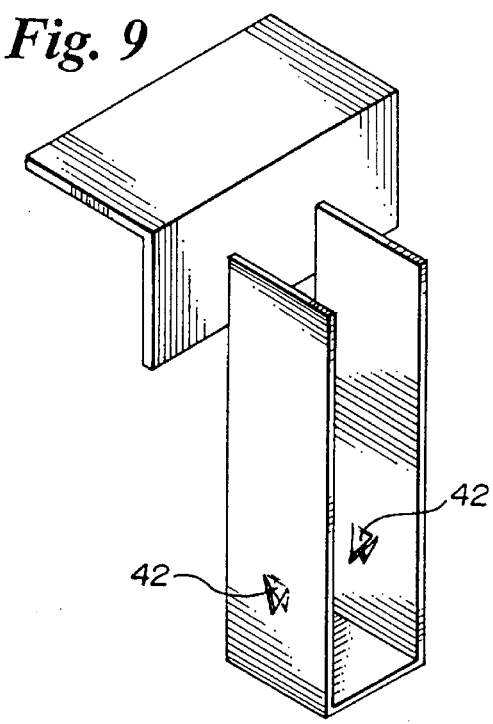
FIG. 9 is an isometric view of an overhead hanger incorporating the features of the present invention.
Figure 10:
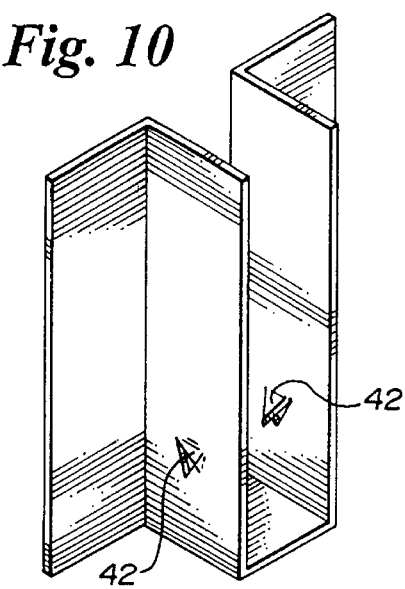
FIG. 10 is an isometric view of a facemount hanger incorporating the features of the present invention.

The hanger 10 includes a pair of side or face support flanges 32, 34 connected to the seat flanges 30, 31, respectively. Each support flange 32, 34 extends from its respective seat flange 30, 31 along a fold line for engagement with the face 12a of the beam 12 (FIG. 1). The side support flanges 32, 34 are provided with nail holes 35 for connection with the front face 12a. The preferred embodiment of FIG. 2 also includes a pair of top support flanges 36, 38 connected with the side support flanges 32, 34 along a bend line. These flanges 36, 38 extend from the top edge of the flanges 32, 34 at right angles and include nail holes 39 for connection with the top edge 12b of the header beam 12. Although the preferred embodiment shows both side 32, 34 and top 36, 38 support flanges and is referred to as a top mount or wrap around hanger, the invention is also applicable to a face mount hanger as shown in FIG. 9 with only side support flanges, an overhead hanger as shown in FIG. 10 with flanges which extend over the header beam, as well as other hanger configurations known in the art.

Each of the seat flanges 30, 31 is provided with a raised angle nailing dimple 40 having a nail opening 41. The nail opening 41 is positioned close enough to the seat 24 so that a nail extending through the opening will engage the bottom flange 15 (FIGS. 1 and 6) of an I-joist as well as the sides of a laminated or dimension lumber joist (FIG. 7). As nails are driven into the openings 41, at a downward angle, there is a tendency for the joist 11 to be pulled or drawn up off the seat 24. As discussed earlier, if allowed to occur, this can result in uneven joists as well as squeaky floors and the like.

To solve the above problem, each of the seat flanges 30, 31 is provided with a holddown tab 42 located on the facing sides of the flanges 30, 31. Although the preferred embodiment shows a holddown tab 42 in each of the flanges 30, 31, the benefits of the present invention can also be achieved with a tab 42 in only one of the flanges 30, 31 or multiple tabs 42 in each flange 30, 31.

As shown more clearly in FIGS. 3–5, the hold down tabs 42 of the preferred embodiment are short generally triangular protrusions extending from the facing sides of each of the seat flanges. As shown best in FIG. 5, each holddown tab 42 has a base 44 and a pair of several retaining edges 45 which intersect at a tip 46. The tip 46 is closer to the seat bottom 24 than is the base 44 so that the tip points downwardly for engagement with the sides of the member 11 (FIG. 1). The retaining edges 45 extend from the base 44 and form an angle "A" at the tip 46. In the preferred embodiment the angle "A" is preferably less than 150°, more preferably less than 120° and most preferably about 90°. Such angle "A" is preferably large enough to provide sufficient rigidity to the tab 42, but small enough to provide sufficient sharpness, so that the tip 46 readily pierces the sides of the joist 11 when inserted.

Figure 12A:
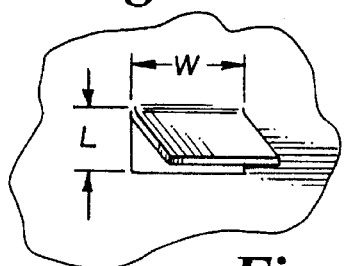
FIG. 12 is an isometric fragmentary view showing an alternate configuration of the holddown tab.
Figure 12B:
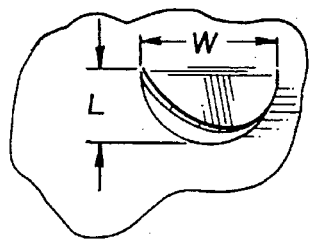
Figure 12C:
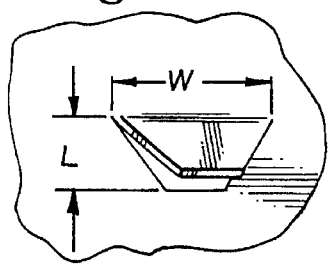

As shown in FIGS. 12A, 12B and 12 C, the tab 42 can embody a variety of configurations which are applicable to various types of joists. For each configuration, however, including the triangular configuration of FIGS. 3–5 as well as the configurations of FIGS. 12A, 12B and 12C, the tab 42 includes a linear base or bend line 44 a free edge defined by the edges 45, 45 of FIGS. 3–5 and by the edge 4B of FIGS. 12A, 12B, 12C, and a singular planar surface.

The size of each of the tabs 42 is such that it functions to retain the member 11 engaged with the seat bottom 24, but not so large that it causes the seat flanges or seat sides to be spaced from the sides of the joist 11. In the embodiment of FIG. 5, the length "L" of the tab 42 is preferably about 0.05 to 0.25 inch and most preferably about 0.05 to 0.2 inch. This length enables the holddown tabs 42 to penetrate the joist 11 when the joist is placed into the seat portion 18 (FIG. 2). In the preferred embodiment, the width "W" of the base 44 is about 0.15 to about 0.4 inch.

In the configurations of FIGS. 12A, 12B and 12C, the width "W" of the base is about 0.15 to about 0.4 inch, while the length "L" of the tab 42 is about 0.05 to 0.25 inch and most preferably about 0.05 to 0.2 inch.

As shown in FIGS. 2, 3, 4, 6 and 7, the holddown tabs 42 are preferably located near the seat bottom 24. Although they can be located anywhere along the seat sides 30, 31 (FIG. 2), the tabs 42 are preferably located sufficiently close to the seat bottom 24 so that they will engage all types of supported wood members or joists, including I-joists and laminated and full dimension lumber joists. In the preferred embodiment, the tip 46 of free edge of the tabs 42 is located about three fourths of an inch from the seat bottom 24; however, this dimension can be varied to some degree. Preferably, however, the dimension from the tip 46 to the seat 24 should be less than about 1½ inches, the common height of the bottom flange 15 of an I-joist.

As shown best in FIG. 4, the holddown tabs 42 extend downwardly towards the seat bottom 24 at an angle "B" relative to the seat flanges 30, 31. Preferably this angle is about 40°–90° and most preferably about 50°–75°. The angle "B" formed between the seat flange 30 and the holddown tab 42 should preferably be sufficiently large to facilitate its retaining engagement with the joist 11, but sufficiently small to prevent spacing of the flanges 30, 31 from the sides of the joist.

Figure 11:
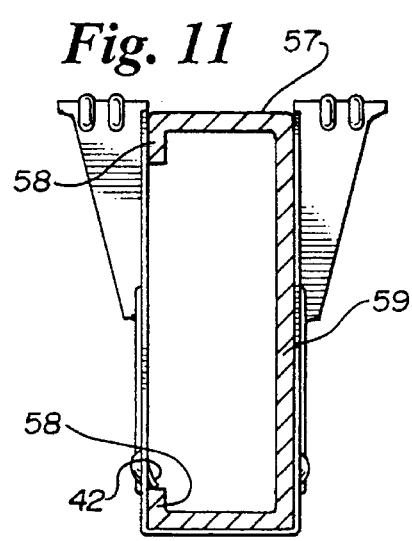
FIG. 11 is a view similar to FIGS. 6 and 7 except that the joist is a steel joist.

FIG. 11 shows use of the hanger of the present invention with a steel joist 57. The steel joist 57 includes a full side 59 and upper and lower returns 58, 58. When inserted into the hanger, the tab 42 on one side of the hanger will engage the top edge of the lower return to retain the joist. The tab on the other side of the hanger can be eliminated as shown. Alternatively, an opening can be made in the full side 59 of the steel joist to receive the tab.

Figure 8:
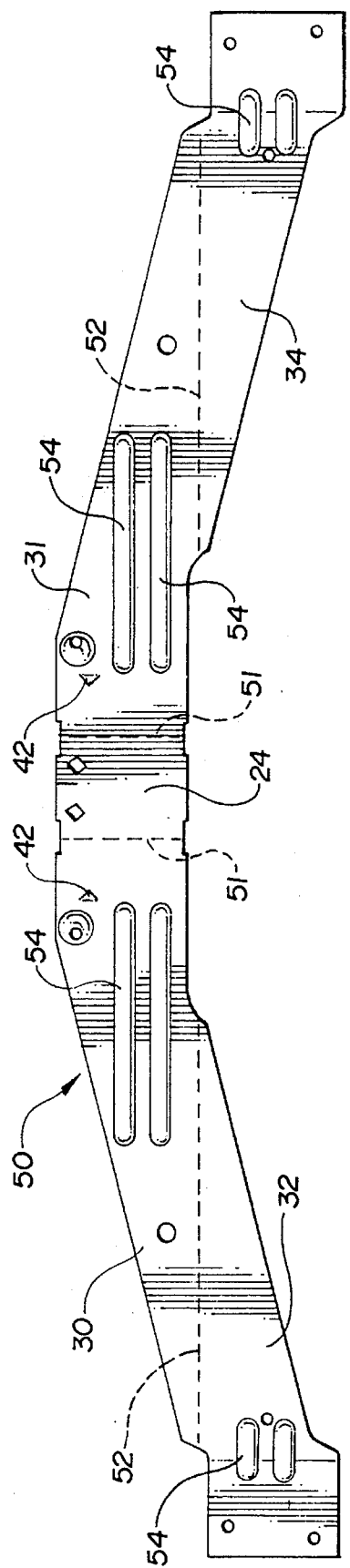
FIG. 8 is an elevational plan view of a hanger blank in accordance with the present invention.

The tabs 42 are formed via a single punch or stamping process in which a hanger blank 50 as shown in FIG. 8 is formed from a sheet of rolled steel or other similar material. Specifically, the tabs 42 are stamped using a die which severs the tab 42 along the side edges of the tab edges 45 and bends the tab along the base edge 44 to the desired angle "B" (FIG. 4). When the tab 42 is bent at the angle "B", the dimension "H" defining the distance between the tip 46 (FIG. 4) or the free edge 43 (FIGS. 12A, 12B and 12C) and the flange 30 or 31 is preferably about 0.05 to 0.1 inch.

The blank includes a pair of bend lines 51, 51 defining the seat bottom 24 and the seat side edges 25, 26 (FIG. 2) and a pair of bend lines 52, 52 separating the side 30 from the flange 32 and the side 31 from the flange 34. A plurality of stiffening ribs 54 are formed in the blank during the punch process.

Having described the detailed structure of the hanger of the present invention and its method of manufacture, its use can be understood best as follows. During construction of a floor, a roof, a deck or any other structure in which hangers of the type described above can be used, the hangers are nailed to a supporting wood member 12 such as a header beam or the like. When this has been completed the joist or other supported members are positioned into the joist receiving seat portions or pockets 18 of the hangers 10 (FIGS. 1 and 2). As these joists move into the seat portions 18, the sides of the joists 11 engage the inner most tips 46 of the tabs 42. Because the tabs 42 are angled downwardly toward the seat bottom 24, the bottom portion of the joists are pushed or driven into the seat portion 18 of the hangers 10. Further because of the orientation of the angled tabs 42, the tabs also function to retain the joists 11 in this desired position. If desired, the carpenter can also insure that the joist 11 is properly seated with the joist 11 engaging the seat 24 by tapping on the top edge of the joist 11 with a hammer. After the joists have been placed into the hangers and positioned as described above, the hangers are connected with the joists 11 by pounding nails through the nail openings 41 into the sides of the joists. Again, because of the presence of the holddown tabs 42, the bottom edge of the joists 11 is retained in engagement with the seat 24, thus preventing it from being drawn up away from the seat 24 as the nail is driven into the nail opening 41.

While preferred embodiments of the present invention have been described, it should be appreciated that various modifications may be made by those skilled in the art without departing from the spirit and scope of the present invention. Accordingly, reference should be made to the claims to determine the scope of the present invention.

What is claimed is:

1. A hanger for supporting a wooden construction member, comprising:

a seat portion having a seat bottom with a pair of side edges;

a pair of seat flanges extending from said side edges of said seat bottom, said seat flanges spaced from one another and each having a facing side facing the other of said seat flanges and each having a front edge and a rear edge; and at least one rigid hold down tab on one of said facing sides extending inwardly from said one facing side toward the other of said facing sides, said hold down tab spaced from and positioned entirely between said front and rear edges and being defined by a fold line having first and second ends and extending parallel to said seat bottom and a pair of slits in said one facing side, said slits starting, at and extending respectively from said first and second ends and converging downwardly toward said seat bottom to an intersection point such that said intersection point is closer to said seat bottom than said fold line,, said hold down tab further comprising a single planar surface throughout its entirety.

2. The hanger of claim 1 wherein said at least one tab has a triangular configuration.

3. The hanger of claim 1 wherein said seat flanges are substantially parallel to each other.

4. The hanger of claim 3 wherein each of said facing sides include a hold-down tab angled downwardly toward said seat bottom.

5. The hanger of claim 1 wherein said tab is angled downwardly toward said seat bottom.

6. The hanger of claim 5, wherein the downward angle of said hold down tab ranges from 40° to 75°.

7. The hanger of claim 1 wherein said paint of slits comprise a pair of straight line slits converging to said intersection point.

8. The hanger of claim 7 wherein said pair of slits form an angle with each other of less than 120°.

9. The hanger of claim 7 wherein said fold line has a length and wherein the length of said fold line is greater than the perpendicular distance between said fold line and said intersection point.

10. The hanger of claim 1 wherein each of said slits is of equal length.

11. The hanger of claim 1 wherein said at least one tab is positioned such that its entirety, including said fold line, is less than 1½ inches from said seat bottom.

12. A hanger for supporting a supported wooden member relative to a supporting wooden member, comprising:

a seat portion for supporting said supported wooden member, said seat portion having a seat bottom with a pair of side edges and a pair of seat flanges extending from said side edges each of said seat flanges having a front edge and a rear edge;

a support flange connected to said rear edge of each of said seat flanges for connection to said supporting member; and a hold down tab formed in at least one of said seat flanges, said holddown tab comprising a substantially rigid tab having a retaining free edge extending toward said seat bottom for retaining engagement with said supported wooden member, said hold down tab spaced from and positioned entirely between said front and rear edges and being defined by a fold line having first and second ends and extending parallel to said seat bottom and a pair of slits in said one facing side, said slits starting at and extending respectively from said first and second ends and converging downwardly toward said seat bottom to an intersection point such that said intersection point is closer to said seat bottom than said fold line, said hold down tab further comprising a single planar surface throughout its entirety.

13. The hanger of claim 12 wherein said holddown tab is positioned less than 1½ inches from said seat bottom.

14. The hanger of claim 12, wherein each of said seat flanges has a hold down tab.

15. The hanger of claim 12 wherein said tab is punched from said at least one seat flange.

16. The hanger of claim 12 wherein said tab has a triangular configuration.

17. A wooden construction comprising:

a wooden supporting member having a top edge, a pair of side faces and a bottom edge;

a wooden supported member having a top edge, a pair of side faces, and a bottom edge;

a hanger for supporting said supported member relative to said supporting member, said hanger comprising:

a seat portion for supporting engagement with the bottom edge of said supported member and having a seat bottom with a first side and a second side and seat flanges extending from said first side and said second side, each of said seat flanges halving a front edge and a rear edge;

a support flange connected with each said seat flange for connection with said supporting member;

a hold down tab formed in at least one of said seat flanges, said holddown tab comprising a substantially rigid tab having a base and retaining edge which includes a tip extending toward said seat bottom for retaining engagement with a side face of said supported member, said hold down tab spaced from and positioned entirely between said front and rear edges and being defined by a fold line having first and second ends and extending parallel to said seat bottom and a pair of slits in said one facing side, said slits starting at and extending respectively from said first and second ends and converging downwardly toward said seat bottom to an intersection point such that said intersection point is closer to said seat bottom than said fold line, said hold down tab further comprising a single planar surface throughout its entirety.

18. The construction of claim 17, wherein said hanger includes a holddown tab formed in each of said seat flanges.

19. The construction of claim 17, wherein said supported member is one of an I-joist, a laminated joist and full dimension lumber.

20. The construction of claim 19 wherein said supported member is an I-joist having a bottom flange with a top surface and the entirety of said tab is below the top surface of said bottom flange when the bottom edge of said supported member is in engagement with said seat portion.

21. The construction of claim 17 wherein said pair of slits comprise a pair of straight line slits converging to said intersection point.

22. The construction of claim 21 wherein said fold line has a length and wherein the length of said fold line is greater than the perpendicular distance between said fold line and said intersection point.

23. The construction of claim 17 wherein said tab has a triangular configuration.

* * * * *